United States Patent [19]
Goedeke et al.

[11] Patent Number: 5,153,722
[45] Date of Patent: Oct. 6, 1992

[54] FIRE DETECTION SYSTEM

[75] Inventors: A. Donald Goedeke, Newport Beach; Benedict Drda, Costa Mesa; Sam Viglione; H. Gerald Gross, both of Santa Ana, all of Calif.

[73] Assignee: Donmar Ltd., Newport Beach, Calif.

[21] Appl. No.: 641,166

[22] Filed: Jan. 14, 1991

[51] Int. Cl.$^5$ .............................................. H04N 7/18
[52] U.S. Cl. ...................... 358/108; 358/93; 340/511; 340/514; 340/588; 382/1; 169/61
[58] Field of Search ......................... 358/93, 108, 113; 340/511, 514, 577, 588, 589; 382/1, 22; 169/61

[56] References Cited

U.S. PATENT DOCUMENTS

| | | | |
|---|---|---|---|
| 4,074,225 | 2/1978 | Vandeweghe | 340/524 |
| 4,112,463 | 9/1978 | Kamin | 358/105 |
| 4,257,063 | 3/1981 | Foughry et al. | 358/108 |
| 4,408,224 | 10/1983 | Yoshida | 358/108 |
| 4,520,390 | 5/1985 | Paredes et al. | 358/108 |
| 4,597,451 | 7/1986 | Moore et al. | 340/577 |
| 4,697,172 | 9/1987 | Kimura | 340/587 |
| 4,750,142 | 6/1988 | Akiba et al. | 169/61 |
| 4,775,853 | 10/1988 | Borruate | 358/108 |
| 4,907,281 | 3/1990 | Hirvoene et al. | 382/1 |
| 4,909,329 | 3/1990 | Yoshida et al. | 169/61 |

Primary Examiner—John K. Peng
Attorney, Agent, or Firm—Roy A. Ekstrand

[57] ABSTRACT

A fire detection system includes a color video camera, a frame grabber and a computer processor operative to store and examine a series of image frames of the viewed area. Ultraviolet and infrared detectors produce event signals when energy received exceeds predetermined thresholds. The processor then rapidly evaluates the images from the camera to determine bright area objects, their location, edge profile, edge flicker, stationarity and spectral characteristics as well as spectral flicker to confirm a fire event. Finally, the size of a confirmed fire image is measured as a final criterion for the release of fire suppressant material, either in a limited zone within which the fire is located or within the entire facility.

22 Claims, 3 Drawing Sheets

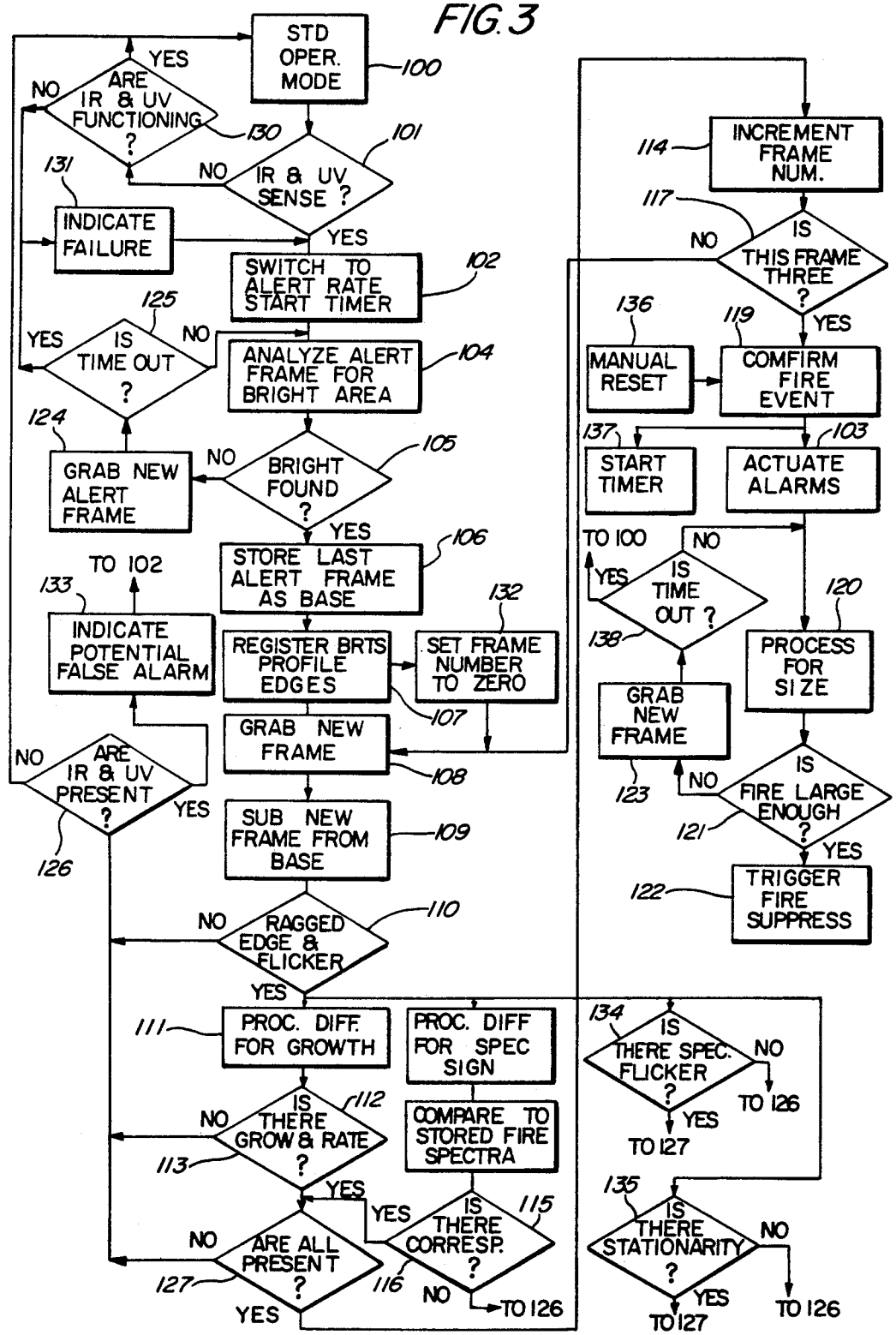

FIRE DETECTION SYSTEM

FIELD OF THE INVENTION

This invention relates generally to fire detection systems and particularly to those utilized to control high speed dispersal of fire suppressant chemicals.

BACKGROUND OF THE INVENTION

A number of industrial and military environments operate under extreme dangers from hydrocarbon fires and the like. For example, military and commercial airplane service and maintenance facilities, chemicals facilities processing flammable liquids such as fuels or the like, and storage or processing facilities for flammable liquids and fuels. In such environments, the existing fire danger creates a need for high speed fire detection and suppression systems. The present systems vary substantially in design. However, all generally utilize one or more detectors together with fire suppressant systems designed to rapidly "flood" the entire area surrounding a suspected fire. The most common type of detectors used are extremely sensitive to energy in the infrared and/or ultraviolet regions of the spectrum. These areas of high sensitivity correspond to the energy emission of a typical hydrocarbon fire. Because of the short interval available for detection of a fire and the distribution of fire suppressant, fire detection systems must operate automatically without the involvement of human operators in the evaluation or decision to disperse fire suppressant.

To meet the needs created for such automatically triggered fire detection and protection systems, practitioners in the art have provided a variety of systems. For example, U.S. Pat. No. 4,775,853 issued to Borruate sets forth a DEVICE AND INSTALLATION FOR THE INSTANTANEOUS DETECTION OF ONE OR MORE PHYSICAL PHENOMENA HAVING A CHARACTER OF RISK in which systems are provided for detection of radiations emitted in the infrared visible and ultraviolet spectra characteristic of risks such as intrusion, fire explosion, leaks of dangerous fluids and electric leaks, disturbances and absence of movement of regular periodic phenomenon. The system comprises a series of filters in combination with a lens and image booster which are coupled to a scanning tube. A preamplifier boosts the signal to sufficient level for operation of a video data processing unit and monitor together with a tape recorder and television telephone transmitter.

U.S. Pat. No. 4,907,281 issued to Hirvonen, et al. sets forth a METHOD OF IMAGE ANALYSIS IN PULVERIZED FUEL COMBUSTION in which an image processing method for flame monitoring is based upon the formation of a video signal characteristic of the combustion process. The flame is monitored by cameras such that the video signal produced thereby defines an average intensity level corresponding to flame characteristics. Other characteristics such as average level may be utilized to define the ignition area.

U.S. Pat. No. 4,074,225 issued to Vandeweghe sets forth an EMERGENCY DETECTION ALARM AND EVACUATION SYSTEM adapted for use in a multi-story building. The systems includes a plurality of spatially distributed fire and smoke detectors and a plurality of exit signaling units for locating the emergency exit doors of the building floor. A control panel in the lobby floor of the building includes lighted indicators which respectively indicate the actuation of particular fire and smoke detectors. Also disclosed is a closed circuit television system for visually monitoring the fire and smoke conditions in selected areas.

U.S. Pat. No. 4,520,390 issued to Paredes, et al. sets forth a BURNER MONITORING SYSTEM in which an array of burners are viewed by a video camera to produce a video signal representing the infrared image of the burner array. Video processing electronics processed the video signal to determine which of the burners is lighted and which is unlighted by the presence or absence of hot spots in the infrared image.

U.S. Pat. No. 4,408,224 issued to Yoshida sets forth a SURVEILLANCE METHOD AND APPARATUS in which an area under surveillance is viewed by a video camera. The image signal from the video camera is converted to data which is stored in a memory. Thereafter, comparison of each new image is carried forward with previous image and an alarm signal generated whenever a difference between successive data images occurs.

U.S. Pat. No. 4,257,063 issued to Loughry, et al. sets forth a VIDEO MONITORING SYSTEM AND METHOD including a television camera scanning the surveilled scenes and means storing a series of image frames. Predetermined areas within the video image are defined for sampling during successive frames. The collection of stored samples is processed to provide a profile of the video signal samples during the frame. Successive frames are then compared to detect differences and trigger alarms in response to predetermined differences.

U.S. Pat. No. 4,112,463 issued to Kammin sets forth a SYSTEM FOR DETECTING A MOTION IN THE MONITORING AREA OF TWO OR MORE TELEVISION CAMERAS in which scenes or objects are monitored and scanned by a plurality of television cameras. The cameras are independent and nonsynchronized with each other. A time division multiplexed image signal derived from the camera signals are stored and compared to subsequently occurring signals to detect changes or motion in the scanned scenes.

While the present systems can quickly detect a fire and trigger the dispersal of fire suppressant chemicals, they are easily fooled by a number of nonfire events. In addition, prior art systems are equally vulnerable to triggering the dispersal of fire suppressant chemicals for trivial or nondangerous fires which might otherwise be easily controlled without the more drastic method of automatic dispersal of fire suppressant chemicals.

In essence, the prior art systems have labored under a basic limitation in that the faster their response time, the more likely they are to be "fooled" by nonfire events. Therefore, the dilemma presented to designers of fire detection and suppression systems is that while fires in such environments have the potential for extreme danger and even catastrophic results and must therefore be controlled and avoided, false alarms and premature or unnecessary triggering of fire suppressant chemical dispersion are costly, damaging and disruptive to operations and therefore must also be avoided. In addition, some fires are trivial or nonthreatening in nature and may be easily controlled by less drastic fire control operations.

The problem presented to fire detection systems is exacerbated by the wide variety of nonfire events which may exist in a fire hazard environment. For example, strong lights, welding units, and objects producing substantial heat such as motors and engines radiate sufficient quantities of ultraviolet and infrared energy to trigger most fire detection systems.

There remains, therefore, a need in the art for a fire detection system which responds quickly and which rapidly determines the existence and degree of a fire. Such systems must be capable of deciding on the appropriate measure to be taken in response to detected fires to avoid false or premature triggering of fire suppressant chemical dispersion.

SUMMARY OF THE INVENTION

Accordingly, it is a general object of the present invention to provide an improved fire detection system. It is a more particular object of the present invention to provide an improved fire detection system which responds quickly while rapidly confirming the validity of a fire event and distinguishing nonfire events, and determining fire size and location.

In accordance with the present invention, there is provided a fire detection system which comprises: detector means for detecting the presence of energy within the spectrum of a fire; video means for producing color video images of an observed area; object means for determining the occurrence of bright objects in the observed area; analyzing means for determining that at least one bright object is a fire if it exhibits ragged edges, edge flicker, growth, stationarity, spectrum corresponding to a known fire spectrum, and temporal and spatial spectral changes; and threshold means for causing a fire response when a bright object determined to be a fire by the analyzing means exceeds a predetermined area.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 3 sets forth a flow chart depicting the operation of the present invention fire detection system.

DESCRIPTION OF THE PREFERRED EMBODIMENT

Figure 1:
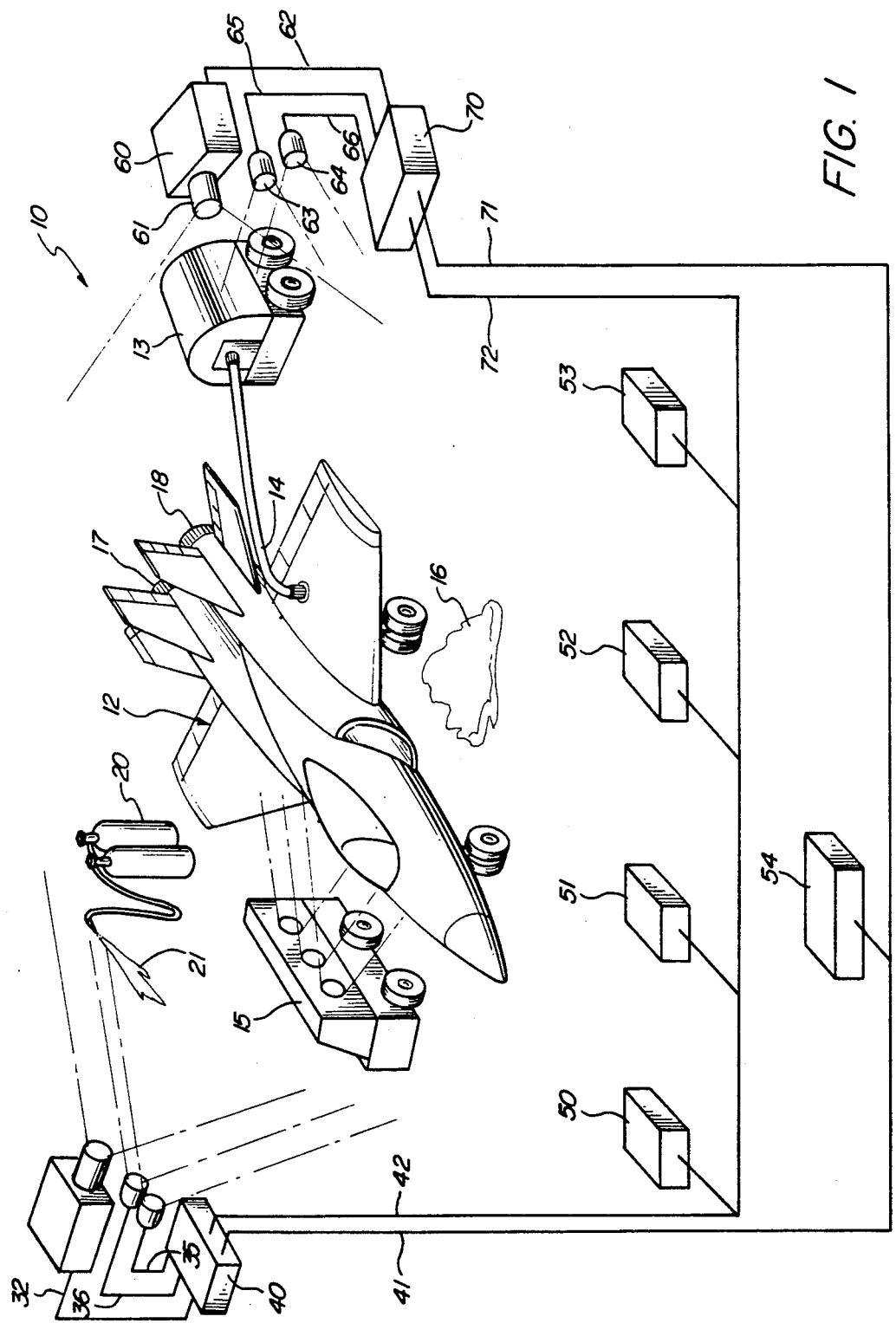
FIG. 1 sets forth a perspective view of a fire detection system constructed in accordance with the present invention.

FIG. 1 sets forth a perspective view of a simplified hangar service area generally referenced by numeral 11 together with a fire detection system constructed in accordance with the present invention and generally referenced by numeral 10. Hangar service area 11 is shown having received an aircraft 12 together with examples of typical equipment to be found within an aircraft hangar. For example, a fueling unit 13 includes a fuel transfer hose 14 coupled to aircraft 12 to transfer aircraft fuel. Similarly, a portable light source 15 supports a plurality of electric flood lights used to illuminate work areas within service hangar area 11. By way of further example, a gas welding torch 20 is shown in use producing a torch flame 21. Also shown is a suspect area 16 upon the floor of service hangar which requires evaluation by the fire detection system 10. It will be apparent to those skilled in the art that portable light source 15, fueling unit 13 and welding torch 20 are merely examples of the types of devices which would be anticipated within a typical service hangar area or an outdoors aircraft associated area and by no means represent the entire spectrum of devices and apparatus having false alarm potential. A plurality of fire suppressor dispersion devices 50, 51, 52 and 53 are shown in a linear array within service hangar 11. It will be apparent to those skilled in the art that fire suppressor dispersion elements 50 through 53 are merely representative and that different arrangements and numbers or fire suppressant dispersal systems are anticipated and used within the variety of fire hazard areas encountered. The essential quality of fire suppressant dispersers 50 through 53 is the capability upon triggering to rapidly reach the fire event or to rapidly "flood" hangar area 11 with a fast moving blanketing cloud and layer of fire suppressing material. An alarm unit 54, constructed in accordance with conventional fabrication techniques, includes conventional systems for producing perceptible alarms such as lights or sounds or combinations thereof.

In accordance with the invention, a color video camera 60 includes a lens 61 positioned to provide a wide area field of a substantial portion of service hangar area 11. The output of camera 60 which comprises the color video information of the image presented by service hangar area 11 is coupled by an output coupling 62 to a processor and controller unit 70. An ultraviolet energy detector 63 is positioned to "view" a substantial portion of hangar area 11 and produces an output signal indicative the ultraviolet energy received which is coupled by an output coupling 65 to processor and controller unit 70. Similarly, an infrared detector 64 is responsive to infrared wavelength energy and is positioned to "view" a substantial area of hangar area 11. The output signal of infrared detector 64 is indicative of the intensity of infrared wavelength energy received by detector 64 which is coupled to processor and controller 70 by an output coupling 66. Processor and controller 70 includes an output line 72 which is coupled to the trigger inputs of fire suppressors 50 through 53. Processor and controller 70 further includes an output 71 which is coupled to the trigger input of alarm unit 54.

A second color video camera 30 includes a lens 31 and an output coupling 32. In its preferred arrangement, camera 30 is positioned to provide a view of service hangar area 11 from a different perspective than that provided by camera 60. An ultraviolet detector 33, similar to ultraviolet detector 63, is positioned to "view" a portion of service hangar area 11 and includes an output 35 coupled to a processor controller 40. By way of further similarity, an infrared detector 34 similar to infrared detector 64 is positioned to "view" a selected area of service hangar area 11 and includes an output 36 coupled to processor and controller 40. Processor and controller 40 receives the output signals of detectors 33 and 34 as well as the color video signal output of camera 30. Processor controller 40 includes an output terminal 41 coupled to the trigger input of alarm unit 54 and an output terminal 42 coupled to the trigger inputs of fire suppressors 50 through 53.

A comparison of camera unit 30, detectors 33 and 34 and processor and controller 40 to camera 60, detectors 63 and 64 and processor controller 70 shows that each camera system and processor controller and detector combination are essentially redundant and are individually coupled to the trigger inputs of fire suppressors 50 through 53 and alarm unit 54. Thus, it will be apparent to those skilled in the art that while either camera unit may operate as a single unit within hangar area 11, it is advantageous to utilize redundant camera units to more completely view various areas of hangar area 11. For example, suspect area 16 within hangar area 11 may be partially or completely blocked from the view of camera 30 but is completely viewable by camera 60. In addition, and as is described below in greater detail, process and controllers 40 and 70 may be configured to utilize the simultaneous image signals of cameras 30 and 60 to recognize certain nonfire events which would be more difficult to distinguish by a single camera.

In operation, camera 30 provides a colored video image of the viewed portion of service hangar 11. The video information provided by camera 30 is periodically stored by processor controller 40 using a conventional frame grabber. In addition, ultraviolet detector 30 and infrared detector 34 simultaneously view the same general area of service hangar 11. Upon the occurrence of an event within the viewed area of service hangar 11 such as suspect area 16 which produces either or both energies in the ultraviolet or infrared region, detectors 33 and 34 produce an input signal to processor and controller 40 which signifies a potential fire presence. Thereafter, by means set forth below in greater detail, processor controller 40 enters the event mode in which the image received by camera 30 is analyzed by processor controller 40. It should be noted that in accordance with an important aspect of the present invention despite the entrance of the system into the event mode, fire suppressant dispersers 50 through 53 remain inactive as the event mode evaluation proceeds, and no fire alarms are activated until the presence of fire is confirmed by the processor controller 40 which analyzes camera 30 image outputs.

Processor controller 40 then evaluates the image present in the selected frame to locate and identify any bright objects within the scene. The stationarity and growth as well as the presence of ragged edges and edge flicker characteristic of a fire are determined. Once a determination is made that such characteristic exists in one or more bright objects, processor controller 40 then evaluates the spectral signature of such bright objects. In this evaluation, processor controller 40 makes use of a stored comparison base typical of hydrocarbon fires or the like to provide a sample fire spectrum. In the event such spectral signature is similar to that of the stored fire spectrum, the system status determines a very high probability exists of a fire's existence. It should be noted, however, that fire suppressant dispersers 50 through 53 remain untriggered as the analysis continues.

Once a very high fire probability has been established, successive frames of the image received by camera 30 are evaluated to determine the existence of spectral flicker. Spectral flicker exists when different spectral signatures occur at the same pixels or picture elements in successive image frames. Once a determination is made that spectral flicker also exists, the system has determined to a certainty that suspect area 16 is indeed a fire. However, in accordance with an important aspect of the present invention described below, fire suppressant dispersers 50 through 53 are not initiated until a final evaluation step is performed in which processor controller 40 evaluates the size of fire area in suspect area 16. This final step is of substantial advantage in the present system in that this evaluation avoids premature or unnecessary triggering of fire suppressant units 50 through 53 for fires which may be readily handled by less drastic methods such as conventional firefighting equipment in response to the ongoing sounds and lights produced by alarm unit 54. If the size of fire of suspect area 16 is of insufficient size to warrant triggering fire suppressors 50, the present invention system continues to repeat the evaluation set forth above and, in the event the fire size of suspect area 16 reaches a size sufficient to warrant the use the fire suppressant, processor controller 40 triggers fire suppressors 50 through 53 which, in accordance with conventional fire suppressant operation, immediately disperse suppressant in the area 11 in the hangar where the fire is determined to be located, or immediately flood the entire service hangar 11 with a rapidly moving cloud and layer of fire suppressant material quickly extinguishing the fire and avoiding further fire damage.

Camera 60, detectors 63 and 64 and processor controller 70 are independent of camera 30, detectors 30 and 34 and processor controller 40. Thus, the above-described operation occurs simultaneously in the combination of camera 60, detectors 63 and 64 and processor controller 70. Thus, in the event either of the camera units had detected a fire of sufficient size, fire suppressant would be triggered notwithstanding the fact that the remaining camera unit had not reached a determination that a sufficiently sized fire existed. Thus, for example, if suspect area 16 remained partially or completely blocked from camera 30 such that camera 30 never reached a positive fire determination to trigger fire suppressant units 50 through 53, in all likelihood, camera unit 60 would have reached the fire and size determination independently and would itself have triggered fire suppressant units 50 through 53. Thus, in accordance with an important aspect of the present invention, the fire detection system may be used in an independent operation or "nonvoting" operation. This represents a substantial departure from prior art systems which attempt to avoid false triggering by requiring that a plurality of detector elements provide simultaneous indications of possible fire existence. In contrast, the present invention system carries forward a high speed precise evaluation which enables a near fool-proof determination of fire certainty and thus permits immediate unqualified fire suppressant response.

In carrying forward the above-described event analysis, the present invention system successively avoids false triggering from the typical sources of false indication which frequently fool prior art systems. For example, the output of portable light unit 15 and aircraft exhaust 17 and 18 may trigger infrared and ultraviolet light detectors 63 and 64 and produce bright light areas in camera 60. However, the evaluation of the present invention system which looks for spatial and temporal edge variations called edge flicker quickly excludes light unit 15 and tail pipes 17 and 18 as nonfire sources. Similarly, the ignition of flame 21 of welding torch 20 produces a sudden bright area which emits substantial infrared and ultraviolet energy. In addition, since flame 21 is in fact a fire, the required fire characteristics will also be present. However, the object growth rate of torch flame 21 will be insufficient to trigger the activation of fire suppressant units 50 through 53. By way of further examples, aircraft 12 produces substantial heat at jet engine tail pipes 17 and 18. The heated tail pipes produce substantial infrared energy which might also fool prior art detectors. However, the evaluations of edge profile and edge flicker as well as object growth rate of the present invention system would quickly exclude the heat of tail pipes 17 and 18 as possible fires. While not shown in FIG. 1, those skilled in the art will, in view of the foregoing, quickly recognize the manner in which other suspect nonfire events will be correctly identified as such by the present invention system but which would otherwise trigger many prior art systems. By way of further example, arc-welding which produces ultraviolet and infrared energy which would trigger most prior art fire detection systems is excluded by the absence of ragged edge profile and edge flicker as well as bright object growth rate. Examination for growth and stationarity excludes moving headlights and so on. While numerous other potential sources of false indication may be contemplated, the present invention system will exclude virtually all.

Figure 2:
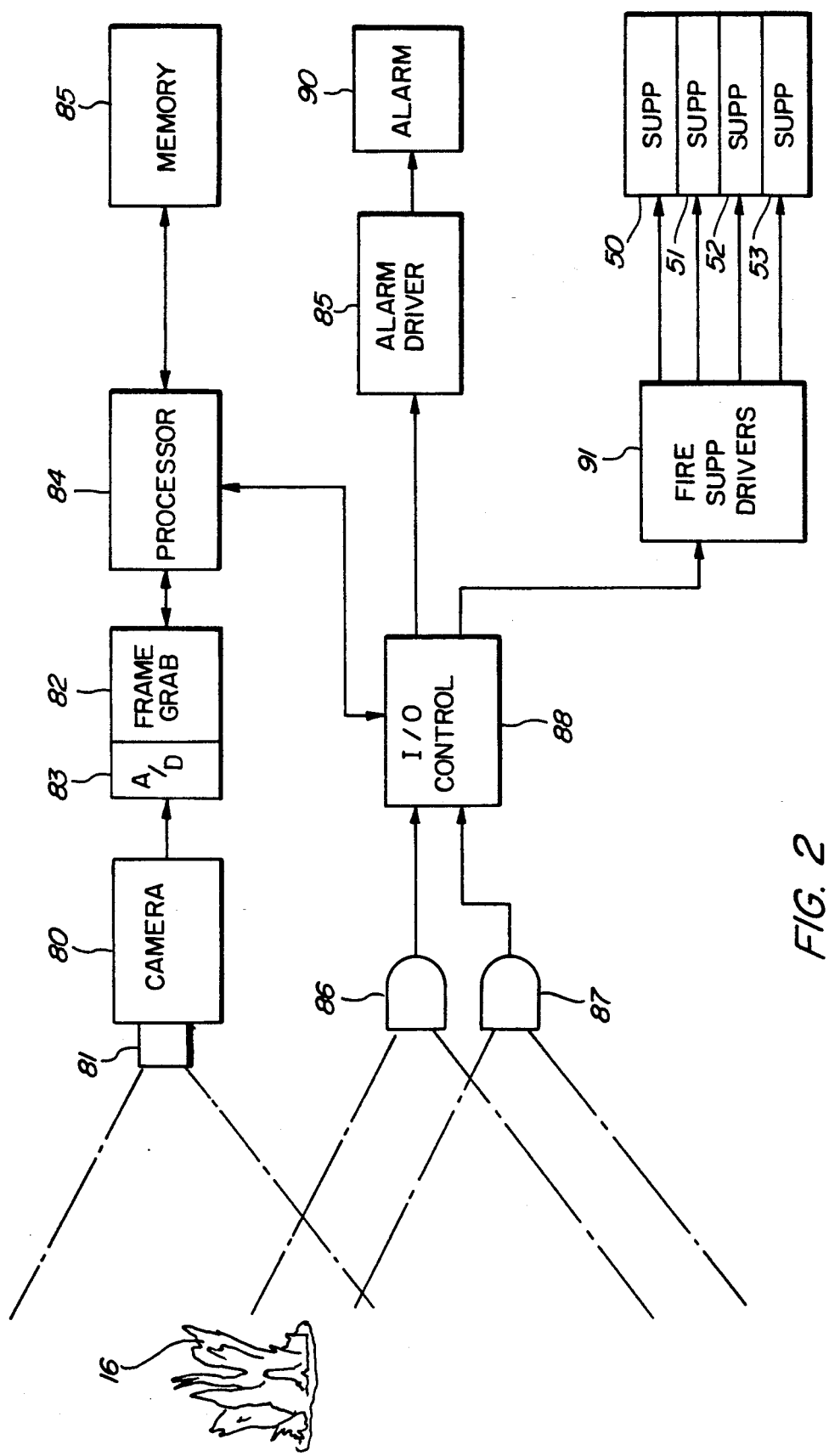
FIG. 2 sets forth a block diagram of the present invention fire detection system.

FIG. 2 sets forth a block diagram of the present invention fire detection system. A color video camera 80, constructed in accordance with conventional fabrication techniques includes a lens 81 having a viewing angle established in accordance with the desired viewing angle needed for the monitored environment. Color video camera 80 may be constructed using any number of presently available color video cameras. However, it has been found advantageous to employ a color video camera having a charge coupled device imager (CCD imager) such as that manufactured by Texas Instruments Corporation having a general device number TC240. Color camera 80 further includes conventional video camera electronics which produce conventional red, blue and green video signals together with appropriate synchronization signals. The output of camera 80 is applied to analog to digital converter 83 within frame grabber circuit 82. Frame grabber 82 is representative of a wide variety of generic devices which perform the function of digitizing and storing a selected image frame from the output of a video source such as camera 80. Generally speaking, frame grabber 82 and analog to digital converter 83 cooperate to convert the analog signal outputs of color video camera 80 to corresponding digital information which is then stored within internal buffers or memories within frame grabber 82 as red, blue and green video images. While a number of different devices for performing the functions of frame grabber 82 and analog to digital converter 83 are known in the art, it has been found advantageous in the present system to utilize a device manufactured by Data Translation having a device number DT2871.

Processor 84 includes an associated memory 85 which provides a stored instruction set under which processor 84 performs in accordance with the flow diagram set forth below in FIG. 3. In addition, memory 85 includes a look up table having stored therein the spectral features or spectral signatures characteristic of fires.

An ultraviolet detector 86 and infrared detector 87 are coupled to an input/output control logic unit 88. Control logic unit 88 is coupled to and controlled by processor 84 in accordance with the operation set forth below in greater detail. An alarm driver 89 is coupled to one output of control logic unit 88 and is in turn coupled to an alarm unit 90. As mentioned above, alarm unit 90 may include one or more of the conventional alarm indicators such as sound producing or flashing light alarms as well as the triggering of remotely located indicators such as security systems consoles. A plurality of fire suppressant unit drivers 91 are coupled to control logic unit 88 and to a plurality of fire suppressant units 50 through 53. As mentioned above, the number of fire suppressant units used in the present invention system is merely by way of example. It will be recognized that any number of units may be needed or used in a specific fire hazard environment.

In operation, processor 84, in accordance with the operation set forth below in FIG. 3, initially operates frame grabber 82 in a standard mode of operation in which an image frame is taken from camera 80 and stored within frame grabber 82 replacing the previously stored frame as a base image. In the standard operating mode, this frame replacement takes place at a relatively slow rate (preferably every second). The system remains in its standard operating mode until ultraviolet detector 86 and infrared detector 87 register the presence of an energy source exceeding their predetermined threshold levels. Once detector threshold levels have been exceeded, processor 84 switches the frame grabbing rate of frame grabber 82 to the event rate (preferably ten frames per second). Concurrently, processor 84 causes control logic 88 to activate alarm driver 89 triggering audible and visual alarm system 90. The operation of alarm system 90 continues during the event mode. Thereafter, processor 84 operates in combination with frame grabber 82 and memory 85 to evaluate the successive frame images in accordance with the operation set forth below. In accordance with an important aspect of the present invention, fire suppressant units 50 through 53 remain inoperative until processor 84 has carried forward the complete analysis underwhich the presence of a fire event which exceeds a predetermined size has been determined to a certainty. As successive image frames are taken by frame grabber 82 and processed and analyzed by processor 84 and memory 85, determinations are made as to whether bright objects exist within the images viewed by camera 80. Bright objects found within the viewed images are identified, their positions determined and their edges are profiled to determine whether they correspond to the characteristic ragged edges of hydrocarbon fires. Once a determination is made that bright objects are present having the required edge character, a base frame having the bright object or objects located and their edges profiled is stored. Thereafter, successive frames are taken by frame grabber 82 and analyzed by processor 84 and memory 85 to determine the remaining parameters characteristic of a hydrocarbon fire. These parameters include the presence of bright image growth, spectral signatures corresponding to a stored set of spectral signatures within memory 85, flickering edge characteristics and spectral changes or flickering of identified sample pixels within successive stored image frames. In the event the above criteria are met, processor 84 confirms the existence of a fire. Thereafter, processor 84 analyzes the last image frame for sufficient fire area to warrant triggering of fire suppressant. In the event the fire image is insufficient, the triggering of fire suppressant units 50 through 53 is delayed and successive image frames are evaluated for fire image size until the fire image area exceeds the predetermined area.

This delay of fire suppressant triggering notwithstanding the confirmation of a fire event permits the intervening use of conventional firefighting operations to control and extinguish the fire without the use of fire suppressant material. In the event, however, that the image area of the fire equals or exceeds the predetermined area, processor 84 signals control logic circuit 88 causing fire suppressor drivers 91 to trigger fire suppressant units 50 through 53 thereby extinguishing the fire.

FIG. 3 sets forth a flow diagram of the operation of the present invention fire detection system. The system operates initially in a standard operating mode at step 100 in which ultraviolet and infrared sensors as well as the color video camera are operating and in which the frame number of the alert frame counter is initially set at zero. Thereafter, the system determines, in a decision step 101, the existence of the alert event, in this case, infrared (IR) and ultraviolet (UV) levels exceeding the predetermined threshold. In the event no such energy is detected, the system moves to a step 130 in which the operational condition of the UV and IR detectors is checked for failure. If no failure is detected, the system returns or continues in its standard operating mode at step 100. If a failure of UV and IR detectors is sensed, the system indicates that failure at a step 131 and moves directly to step 102. In the event infrared and ultraviolet thresholds are exceeded, the system moves to step 102 in which the alert mode is entered and the frame sampling rate is switched to a faster alert mode rate. Concurrently, at step 102, the event timer is started. Thereafter, the system moves to a step 104 in which the first alert frame is analyzed for bright areas. Next, the system moves to a decision step 105 in which a determination is made as to whether bright areas are found within the first alert frame. In the event no bright areas are found, the system moves to a step 124 in which a new alert frame is taken. Thereafter, the event timer is examined at step 125. In the event the event timer has timed out, the system returns to the standard operating mode. If, however, the event timer has not timed out, the system returns to step 104.

In the event bright areas are found within the first alert frame at step 105, the system moves to step 106 in which the last alert frame is stored as a base frame. This stored base frame remains for all successive alert frame comparisons. Next, the system moves to a step 107 in which the locations of bright areas within the base frame are registered and in which the edges of bright areas are profiled. From step 107, the system sets the frame number to zero in a step 132 and moves to a step 108 in which a new alert frame is taken and thereafter to a step 109 in which the newest frame is subtracted from the base frame.

A determination is made at decision step 110 as to whether the profiled edges of the base frame and first alert frame exhibit the ragged character and edge flicker typical of hydrocarbon fires. In the event the edge characteristic does not correspond to hydrocarbon fires, the system moves to a step 126 in which the presence of UV and IR energies is determined. If UV and IR energies are present, the system indicates a potential false alarm at step 133 and returns to step 102. If UV and IR energies are not present, the system returns to the standard operating mode at step 100. Thus, successive frames are examined until a determination is made at step 110 that the characteristic ragged edges and edge flicker are present. Thereafter, the system moves concurrently to steps 111, 112, 134 and 135. At step 111, the subtracted image is processed for image growth analysis while at step 112 the subtracted image is processed for the spectral signatures characteristic of a hydrocarbon fire. From step 112, the system moves to a step 115 in which comparison is made to a stored set of spectral signatures corresponding to a hydrocarbon fire is made. At decision step 116, a determination is made of the spectra correspondence. If sufficient correspondence is not found, the system returns to step 126. If correspondence is found, the system moves to a decision step 127. At step 134, a determination is made as to whether spectral flicker, both temporal and spatial, is present. If no spectral flicker, the system returns to step 126. If spectral flicker is found, the system moves to decision step 127. At step 135, a determination is made as to whether the bright object exhibits stationarity, that is, whether it grows or spreads from its initial location or moves on completely. If stationarity is exhibited, the system moves to decision step 127.

Concurrently, a determination is made at step 111 and decision step 113 as to whether the growth rate of a fire is exhibited in the subtracted image. In the event such growth rate are not found, the system returns to step 126. If growth rate are found, the system moves to a decision step 127. At decision step 127, a determination is made as to whether all the examined characteristics of a fire event have been satisfied. If they have not, the system returns to step 126. If all are present, the system moves from step 127 to step 114. It should be apparent that the system may be configured to accept a lesser response than all four characteristics if desired. However, it is believed advantageous in most environments to require all four. In any event, at step 114, the frame number is incremented and thereafter to a decision step 117 in which a determination is made as to whether the frame number is three. If the frame number has not reached three indicating the third consecutive frame satisfying the required fire determinant conditions, the system returns to step 108. If, however, the frame number has reached three, the system moves to step 119 in which the existence of a fire is confirmed. A manual reset 136 may be provided to manually shut down fire confirmation if desired.

Following confirmation of the existence of a fire, the system starts a timer at a step 137 and actuates one or more conventional type alarms at step 103. Thereafter, the system moves through steps 120 and 121 in which the fire image area is analyzed for sufficient size to trigger fire suppressant. If at step 121 it is determined that insufficient fire image area is present, the system moves to a step 123 in which a new frame is taken and a determination of timer status at step 138 is made. If the timer set in step 137 has timed out, the system returns to standard mode 100, if not it returns to step 120 and size is again determined. Once the fire image has reached sufficient size or image area, the system moves to step 122 in which the fire suppressant units are triggered. It should be noted that the information within the system provides both the fire location and fire size. As a result, the extent and location of fire suppressant dispersed may be selected to suit the fire giving a localized suppressant capability.

The fire size reference for triggering fire suppressant may be provided in different ways. However, it has been found advantageous to use the scan line number in the video image as an indexing reference. Thus, because each scan line of the camera image corresponds to a line on the observed area, the distance from the camera to a bright object is given by the scan line number and its location by its horizontal position on the scan line. While some variation occurs due to image contour, the scan line number has been found to be sufficiently accurate as a distance indicator. Using a look-up table within memory 85 (seen in FIG. 2), a reference image size for each distance may be obtained. As a result, the system compensates for the image size differences of a fire due to distance from the camera and knows both its size and location.

It will also be apparent to those skilled in the art that while the preferred embodiment of the invention set forth herein uses ultraviolet and infrared detectors to initiate a fire alert, the system may be used without them. In such case, the alert mode may be entered in response to any other selected criteria such as the appearance of a bright image object.

For each installation, calibration may be provided by use of bright markers distributed across the floor of the observed area.

It will be apparent to those skilled in the art from the foregoing that the present invention fire detection system provides improved reliability and avoidance of false alarm events. The system shown utilizes infrared and ultraviolet detectors to switch the present invention system to an alert mode in which additional criteria of the event are analyzed to assure that a fire event has occurred.

In addition, notwithstanding the confirmation of a fire event, the use of fire suppressants is initiated only after a determination of fire size has been made.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A fire detection system comprising:
   detector means for detecting the presence of energy within the spectrum of a fire and producing an analysis initiating signal;
   video means for producing color information video images of an observed area including objects therein;
   object means responsive to said video images for determining the presence of bright objects in the observed area;
   analyzing means responsive to said analysis initiating signal for determining that at least one bright object is a fire if it exhibits ragged edges, edge flicker, growth, stationarity, spectrum corresponding to a known fire spectrum, and spectral changes and producing an analysis output signal indicative of the occurrence of a fire; and
   threshold means analysis responsive to said output signal for determining the size of said bright object causing said analysis output signal and for causing a fire response when bright object determined to be a fire by said analyzing means exceeds a predetermined area.

2. A fire detection system as set forth in claim 1 further including alarm means responsive to said detector means for producing an alarm action when energy within the spectrum of a fire is detected.

3. A fire detection system as set forth in claim 2 wherein said threshold means includes fire suppressant means for dispersing fire suppressant chemicals in the observed area of said fire response.

4. A fire detection system as set forth in claim 3 wherein said video means includes:
   a color information video camera;
   video frame grabber means coupled to said video camera for producing and retaining image signals of a selected frame; and
   processor means for controlling the operation of said frame grabber.

5. A fire detection system as set forth in claim 4 wherein said analyzing means includes means for storing the video image from said frame grabber as a base image, storing a first subsequent image frame, and subtracting the first subsequent frame from the base frame.

6. A fire detection system as set forth in claim 5 wherein said analyzing means includes a memory having stored therein the spectral information of a known fire.

7. A fire detection system as set forth in claim 6 wherein said analyzing means includes means identifying predetermined portions of the image area of bright objects for frame-to-frame comparison for spectral changes.

8. A fire detection system as set forth in claim 7 wherein said analyzing means further includes means for storing a second subsequent image frame and subtracting the second subsequent frame from the base frame.

9. A fire detection system as set forth in claim 8 wherein said analyzing means for storing successive image frames and subtracting each from the base until the bright image area of any bright object in a predetermined number of successive image frames continuously exhibits ragged edges, edge flicker, growth, stationarity, spectrum corresponding to a known fire spectrum and spectral changes.

10. A fire detection system as set forth in claim 1 wherein said video means includes a color video camera having successive scanned lines of the observed area and wherein said threshold means includes distance means adjusting the size of the predetermined area as a function of the camera scan line or lines within which the bright object appears.

11. A fire detection system as set forth in claim 10 wherein said distance means includes a look up table.

12. A fire detection system comprising:
    video means for producing color video images of an observed area;
    object means for determining the presence of bright objects in the observed area;
    analyzing means for determining that at least one bright object exhibits a spectrum corresponding to a known fire spectrum; and
    threshold means for causing a fire response when bright object determined to be a fire by said analyzing means equals or exceeds a predetermined area.

13. A fire detection system as set forth in claim 12 wherein said analyzing means includes means for examining the bright object for spectral variations within the bright object.

14. A fire detection system as set forth in claim 13 wherein said analyzing means includes means for examining the bright object for spectral variations as a function of time, and a function of location within the bright object's profile.

15. A fire detection system as set forth in claim 14 wherein said analyzing means includes means for examining the bright object for growth and stationarity.

16. A fire detection system as set forth in claim 15 wherein said analyzing means includes means for examining the bright object for flicker.

17. A fire detection system as set forth in claim 16 wherein said analyzing means includes means for examining the bright object for edge flicker.

18. A method for detecting the presence of a fire within an observed area comprising the steps of:
producing color information video images including object information of the observed area;
examining the color information video images of the observed area produced by said producing step for the presence of bright objects therein;
determining the edge profiles of any bright objects found in said examining step and any change of edge profiles thereof;
determining the image area of said bright objects and the occurrence of growth of said bright objects found in said examining step;
observing the spectra of bright objects found in said examining step and comparing the spectra observed therein to the spectrum of a known fire;
determining the occurrence of spectral changes in selected portions of the bright objects found in said examining step;
confirming the existence of a fire when the image area of any bright object exhibits ragged edges, edge flicker, growth, stationarity, spectra corresponding to a known fire spectrum, and spectral changes;
comparing the image area of a bright object confirmed to be a fire in said confirming step to a predetermined threshold image area; and
releasing a fire suppressant when the size of the image area confirmed to be a fire in said confirming step equals or exceeds said predetermined threshold image area.

19. The method of claim 18 further including the steps of detecting the presence of either an ultraviolet or infrared energy source in the observed area and inhibiting said step of releasing a fire suppressant in the absence of either detected ultraviolet or infrared energy.

20. The method of claim 19 wherein said step of examining includes rejecting bright objects having a size smaller than a predetermined size.

21. The method of claim 20 wherein said step of determining the growth of the bright object includes determining the stationarity of the bright object.

22. The method of claim 18 further including the step of determining the size and location of a fire confirmed in said confirming step and releasing fire suppressant in response to such location and size of fire.

* * * * *